June 8, 1937.  D. WOOD ET AL  2,083,210
APPARATUS FOR MAKING TRUNCATED CONICAL TUBES
Filed Aug. 25, 1936  4 Sheets-Sheet 4
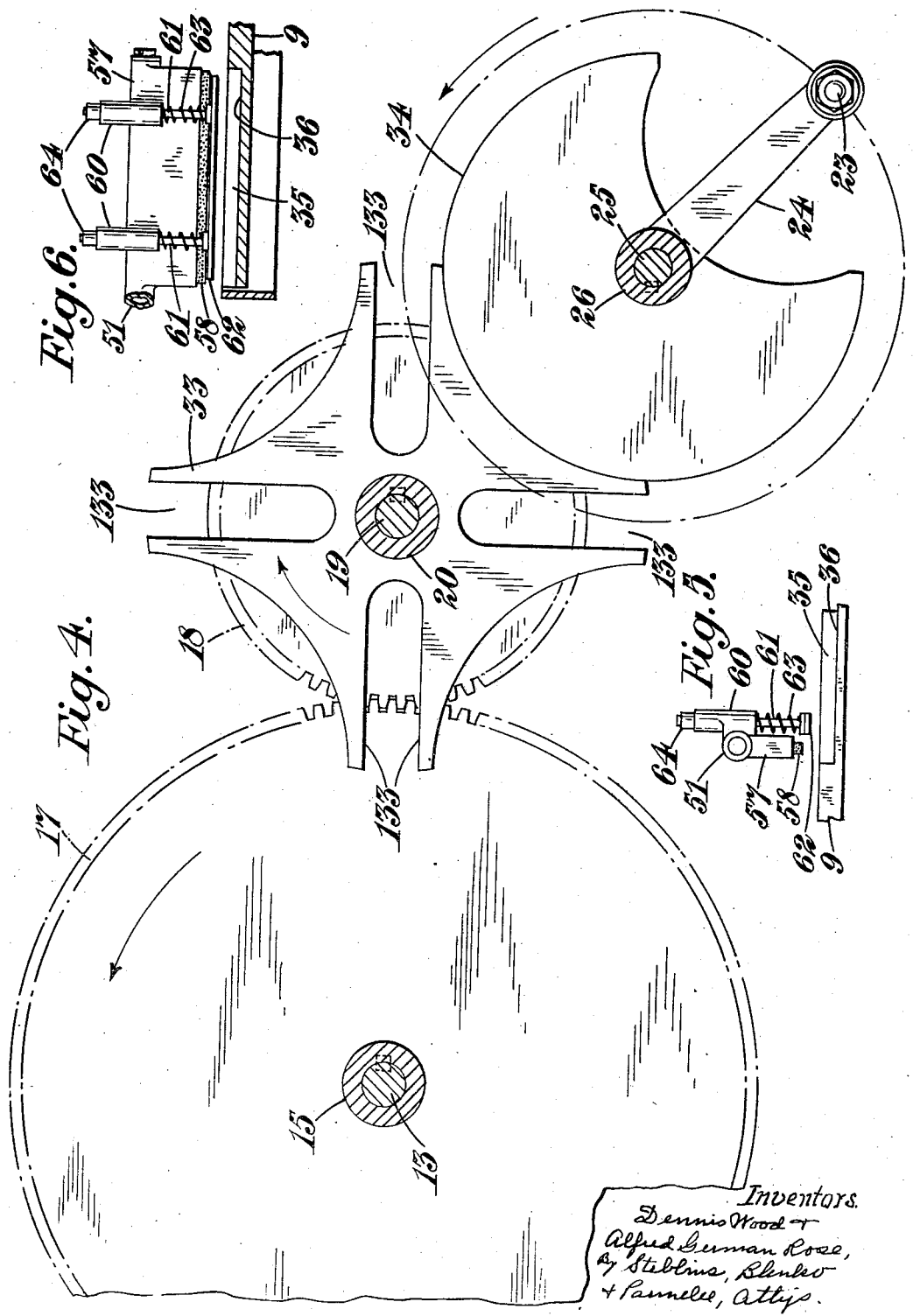

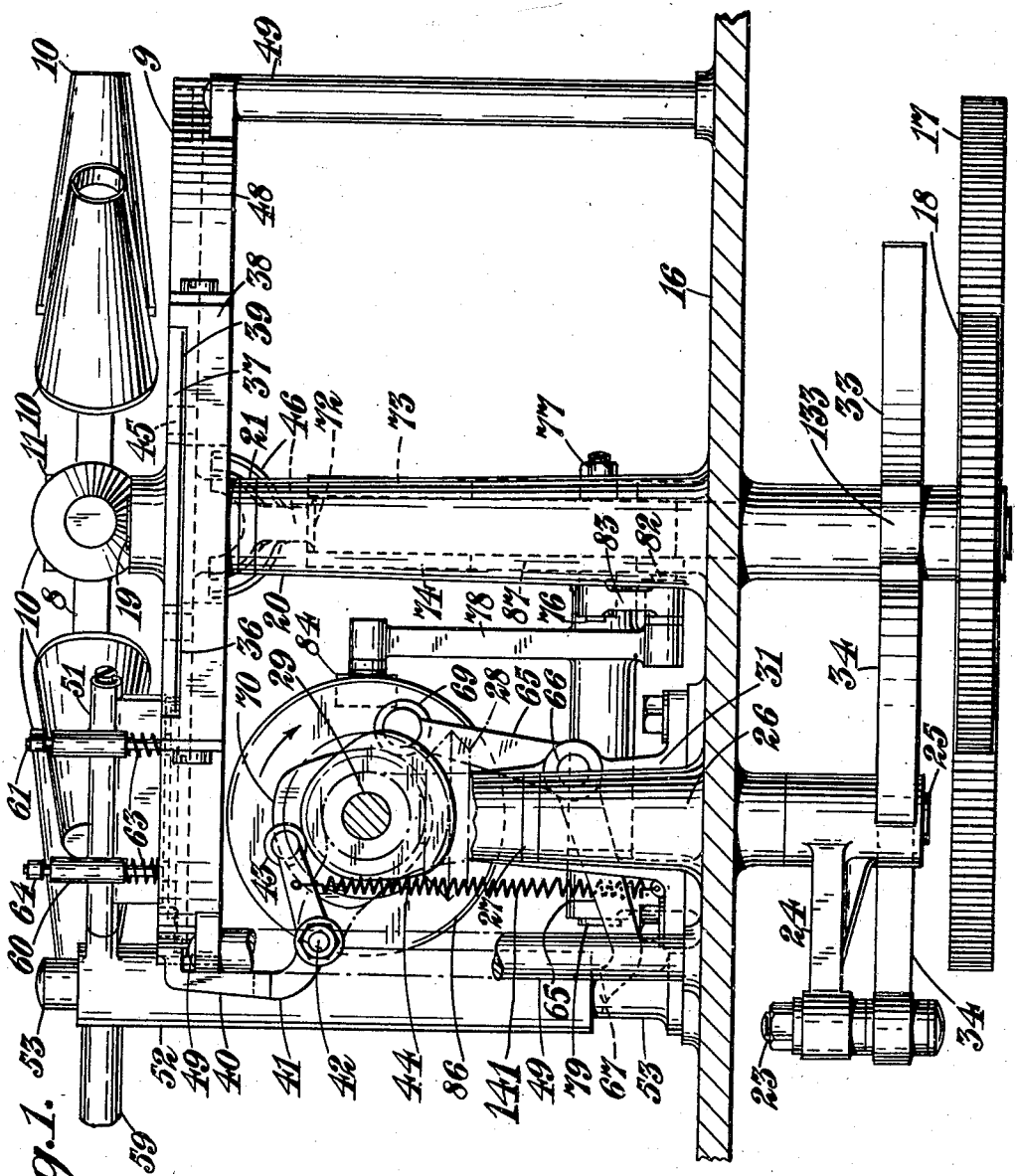

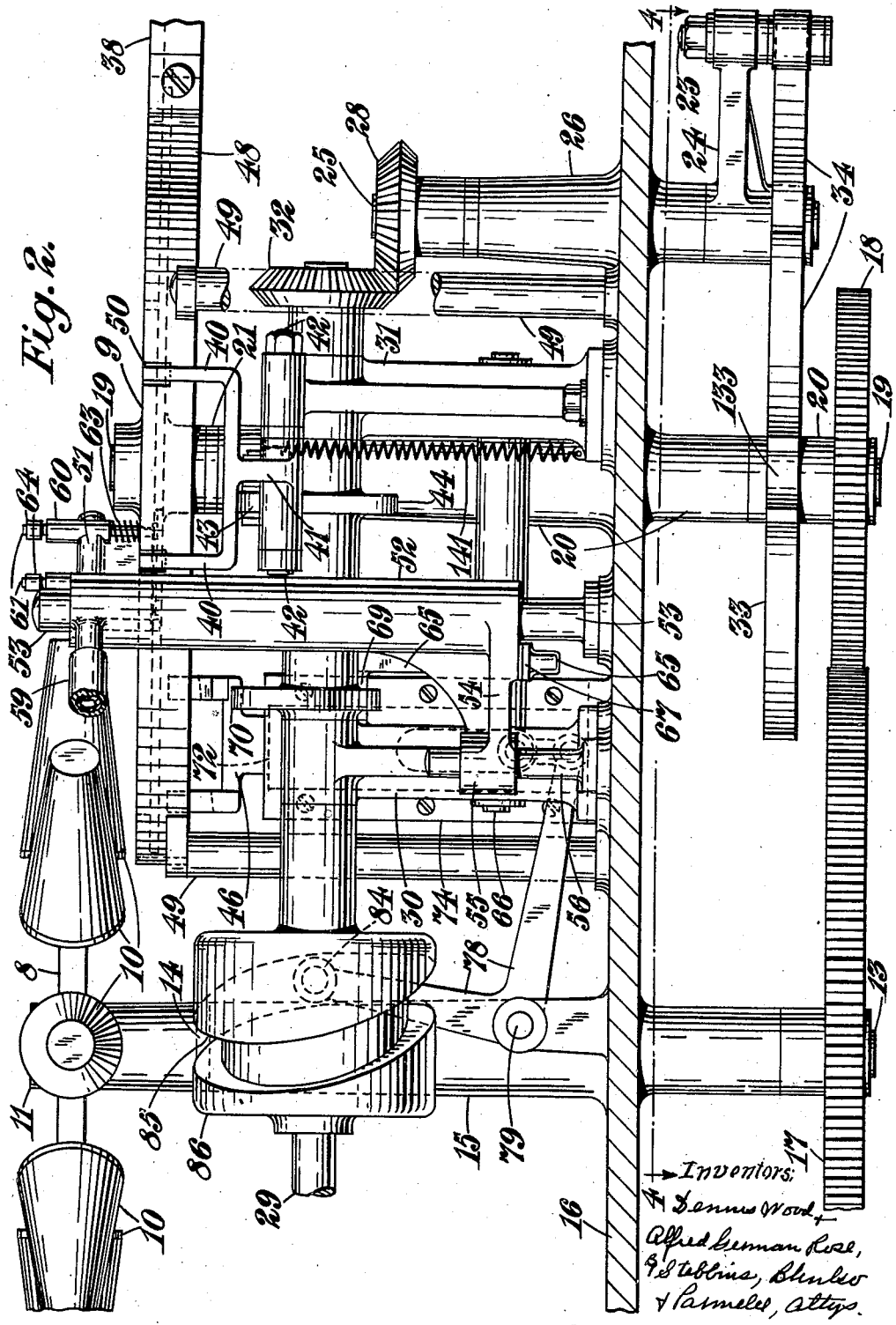

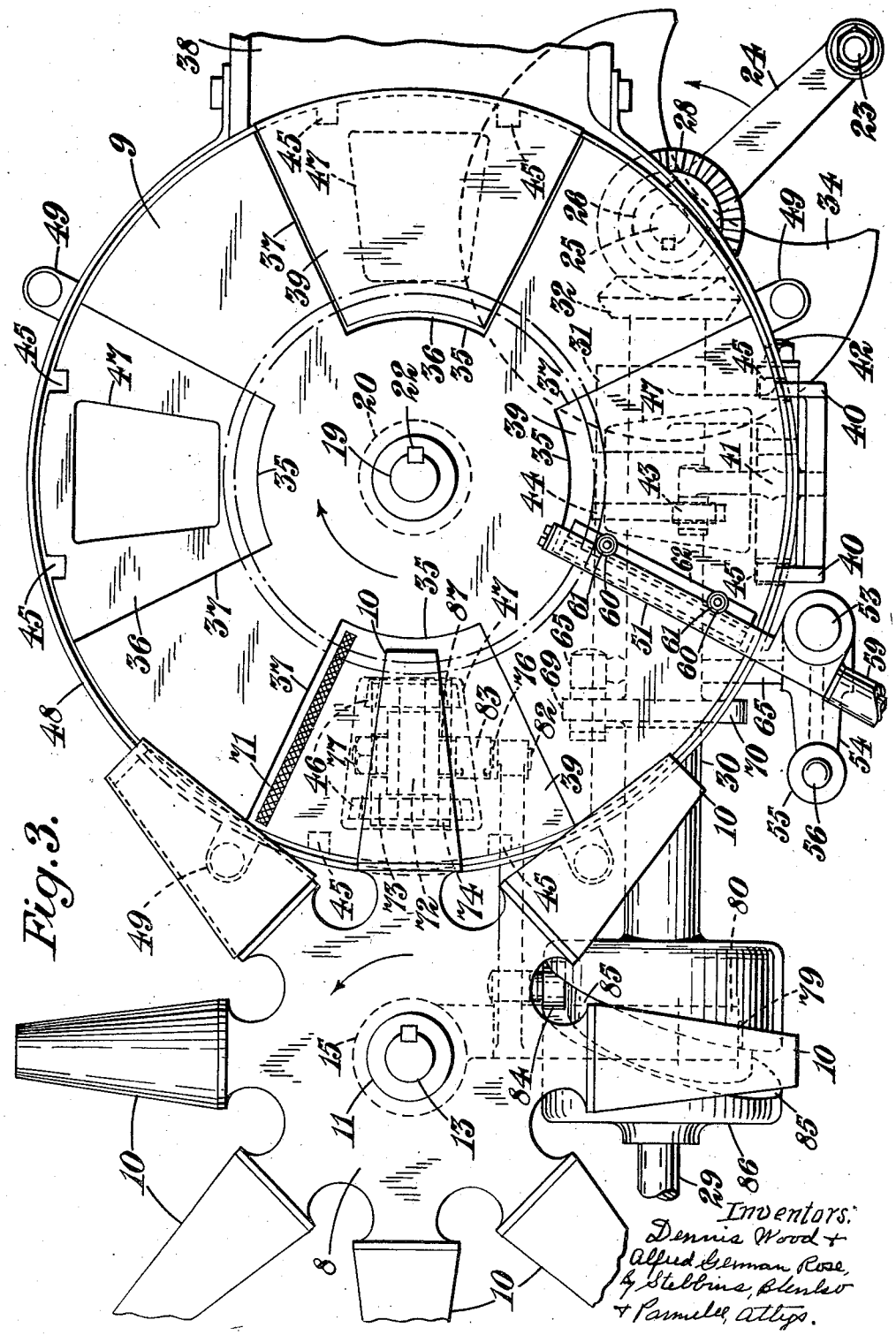

Patented June 8, 1937

2,083,210

UNITED STATES PATENT OFFICE 2,083,210

APPARATUS FOR MAKING TRUNCATED CONICAL TUBES

Dennis Wood, Manchester, and Alfred German Rose, Gainsborough, England

Application August 25, 1936, Serial No. 97,848
In Great Britain August 29, 1935

8 Claims. (Cl. 93—36.4)

This invention relates to mechanism for making truncated conical tubes from sheets of cardboard or other material, hereinafter termed "blanks" each of which has a pair of converging edges.

This invention is concerned with mechanism of the kind comprising a conical former, conveying mechanism for conveying a blank from the receiving station in which the blanks are fed into the mechanism to a blank-applying station where the blank is located adjacent the former, means for moving the blank into contact with the former, and means for wrapping the blank about the former into a truncated conical tube. Usually a plurality of formers is provided, and the formers are arranged radially and are moved as a set intermittently so that each pauses in turn at the blank-applying station to permit of a blank being applied to it. The converging edges of the blank are joined together after it has been wrapped round the former in any suitable manner, for example by means of gum applied to the blank while it is being conveyed to the applying station.

The object of the present invention is to provide an improved form of conveying mechanism incorporating means for ensuring that the blank is accurately applied to the former.

According to the present invention there is provided in or for mechanism of the kind set out above conveying mechanism which comprises a turntable on to which the blank is fed at the receiving station and which has a pair of guides on its upper surface that converge towards the centre of the table, the blank being received between the guides, means for rotating the turntable intermittently so that it pauses with the guides located at the receiving station, a locating station and the applying station successively, and means at the locating station operable automatically to move a blank supported on the table between the guides inwardly of the table so that its converging sides are engaged with the guides to locate the blank in a definite position on the table. With this arrangement each blank may be fed on to the table by hand or by conveying mechanism without special care being taken to locate it accurately on the table since the locating means will accurately locate the blank on the table and the latter will be accurately positioned by the table at the applying station.

Preferably the guides are formed by the converging sides of a shallow recess or tray in the surface of the table. A plurality of pairs of guides may be provided and may be so spaced apart that one pair is located at each of the three stations each time the turntable pauses in its motion.

Locating means may comprise a finger or fingers movable in a vertical plane more or less radial to the table to engage the outer edge of the blank and move it towards the centre of the table.

Where the edges of the blank are secured together by adhesive after being wrapped round the former, there may, in accordance with the feature of this invention, be provided a gum-applying device operable to apply gum to the upper surface of the blank while it is resting at the locating station and after it has been located by the locating means.

A preferred embodiment of the present invention will now be described by way of example only with reference to the accompanying drawings, in which—

Figure 1 is an end elevation of the mechanism,

Figure 2 is a side elevation of the mechanism,

Figure 3 is plan of the mechanism,

Figure 4 is a section on the line 4—4 of Figure 2,

Figure 5 is a detailed end elevation of gum-applying means in the mechanism, and Figure 6 is a side elevation of the gum-applying means.

The invention is shown in the drawings as applied to a known type of tube-making machine. Since the invention is not concerned with the actual tube-making mechanism only as much of this mechanism as is necessary for the understanding of the invention is described.

The mechanism comprises a former-wheel 8 and a turntable 9. The former-wheel 8 carries eight formers 10 which are arranged radially. The wheel 8 has an integral boss 11 which is keyed on to a shaft 13. The shaft 13 is supported in a bearing 15 carried by a table 16. A gear wheel 17 is keyed on to the bottom of the shaft 13 and meshes with a gear wheel 18 keyed to a shaft 19. This shaft is supported in a bearing 20 and the table 9 is keyed to its upper end. The shaft 19 is driven by a Geneva mechanism from a shaft 25 which is driven continuously. The shaft 25 carries an arm 24 on the end of which is a roller 23. As the shaft 25 rotates, the roller 23 enters one of four slots 133 in a Geneva member 33 and drives the shaft 19 through a quarter of a revolution while the shaft 25 itself is turning through one quarter of the revolution. During the remaining three-quarters of each revolution of the shaft 25, the shaft 19 remains stationary and is locked in position by a locking plate 34 which engages the member 33. The gear ratio between the wheels 18 and 17 is 2:1 so that the wheel 17 turns through one-eighth of a revolution while the shaft 19 is making one of its intermittent movements of a quarter revolution. With this arrangement each of the formers 10 will move through one-eighth of a revolution and will then pause in one of eight stations.

The shaft 25 is supported in a bearing 26 and has a bevel wheel 28 secured at its upper end. This bevel wheel meshes with the bevel wheel 32 secured to the main driving shaft 29. The shaft 29 is supported in bearing brackets 30, 31 and carries cams for actuating various mechanism to be described hereinafter.

The upper surface of the turntable 9 is provided with four equally spaced shallow recesses or trays 36. Each tray has two converging sides 37 which constitute guides for a blank, as will be described hereinafter and a curved side 35. The fourth and outer side of the tray is open so that a blank 39 can be fed into one of the trays from a feed counter 38. As the table 9 rotates intermittently in a clockwise direction, each tray pauses successively first in a receiving station in which it is opposite the counter 38, then in a locating station, next in an applying station in which the tray is below one of the formers 10 and finally in a fourth station.

At the receiving station a blank is fed on to a tray either by hand or by some convenient conveying mechanism. The turntable then turns through a quarter revolution so that the tray and the blank are moved round to the locating station. At this station the blank is moved inwardly of the table so that its converging edges engage the guides 37 and locate the blank in a definite position on the table. This is effected by locating means comprising a pair of fingers 40 formed integrally with a bell crank lever 41 (Figure 1) which is pivoted on a spindle 42 carried by an extension of the bearing bracket 31. The bell crank 41 has a roller 43 co-operating with a cam 44 secured to the driving shaft 29. The lever 41 is rocked clockwise (as seen in Figure 1) by a suitable spring 141, so as to hold the roller 43 against the cam 44. While the rise of the cam 44 is engaging the roller, the fingers 40 will be held away from the turntable 9 and the latter will be rotating. It should be mentioned that the shaft 29 turns through one revolution per cycle of the mechanism. After the turntable has come to rest, the cam 44 permits the spring to rock the lever 41 clockwise so that the fingers 40 move into slots 45 (see Figure 3) in the turntable and engage the outer arcuate edge of the blank 39 and move the blank inwardly of the turntable. The converging edges of the blank then engage the guides 37 and locate the blank definitely on the table. Just before the turntable commences to move again, the cam 44 rocks the arm 41 and fingers 40 counter-clockwise away from the table.

Gum or other adhesive is applied to the blank while the latter is being pressed towards the centre of the table and against the sides of the tray by the fingers 40. The gum is applied by the following mechanism.

A tube 51 is provided with a bearing tube 52 which is mounted to slide on a vertical column 53 supported by the table 16. The lower end of the bearing tube 52 is formed with an arm 54 (Figures 2 and 3) carrying a collar 55 sliding on a vertical column 56 so that the tube 52 and the parts supported by it cannot rotate about the column 53. Gum is supplied to the inside of the tube 51 by means of a flexible hose 59 from a suitable reservoir. The tube 51 is formed with a depending portion 57 which is hollow and which has an elongated slot on its lower surface. A strip of felt or other absorbent material 58 is inserted in this slot and will be impregnated with gum supplied through the tube 51. The bearing tube 52 rests on a shoe 67 formed on the end of a bell crank lever 65 that is pivoted at 66 on the bracket 30. The lever 65 carries a roller 69 engaging a cam 70 on the shaft 29. Normally the rise of the cam 70 co-operates with the roller 69 to hold the lever 65 displaced clockwise from the position shown in Figure 1. The lever 65 in turn lifts the bearing sleeve 52 so that the parts carried by this sleeve will be in the position shown in Figure 5 with the pad 58 raised above the level of the table 9. After the blank has been located at the locating station, the cam 70 permits the arm 65 to rock counter-clockwise so that the parts supported by this arm are lowered under their own weight and the felt pad 58 engages the surface of a blank and applies a line of adhesive to it as shown at 71 in Figure 3. Before the table moves again, the cam 70 rocks the lever 65 clockwise and raises the gum-applying mechanism above the table.

There is a possibility that the blank might stick to the pad 58 and be lifted from the table. This is prevented in the following manner. The tube 51 carries a pair of bearings 60 (Figures 5 and 6) in which slide spindles 61. These spindles are secured at their lower end to a foot 62 and are pressed downwardly by springs 63 arranged between the bottom of the bearings 60 and the foot 62. Downward movement is limited by collars 64 secured on the top of the spindles 61. Normally the foot 62 is below the level of the felt pad 58 as shown in Figure 5. When the gum-applying mechanism is lowered so that the felt pad 58 engages the upper surface of a blank, the foot 62 also engages the blank and the spindles 61 slide upwardly in the bearings 60, the springs 63 being compressed. As the gum-applying mechanism rises, the felt pad 58 will leave the surface of the blank but the foot will be held down against the blank by the pressure of the springs 63 and will not start to rise until the tops of the bearings 60 have engaged the collars 64. This will not occur until the pad 58 is clear of the blank. The foot 62 thus serves to hold the blank down on the table until the pad 58 has been completely separated from the blank so that the blank will not be lifted with the pad.

The next movement of the turntable brings the blank to the applying station in which it is located beneath one of the formers 10. The blank is then lifted into engagement with the former by means of a member 46 which, as shown in Figures 1 and 3, has two semi-circular arms. The member 46 is supported on the sliding member 72 which slides between two guides 73, 74. A pin 76 is secured to the member 72 by means of nuts 77 and is connected by a link 83 to the end 82 of bell crank lever 78. This bell crank lever is pivoted about a spindle 79 supported in suitable bearings and carries a roller 84 engaging a cam groove 85 in a cam 86 secured to the shaft 29. The cam 86, through the connections just traced, raises the member 46 so as to lift the blank against the former. Owing to the shape of the member 46, the blank is partly wrapped around the former. Suitable mechanism (not shown) retains the blank in position after which the member 46 is lowered again. Further mechanism (not shown) is provided for completing the wrapping of the blank around the former. This mechanism forms no part of the present invention and will not be described.

The member 46 rises through an opening 47 in the floor of the tray. A guard ring 48 surrounds the table and is supported on suitable bearings 49.

We claim:

1. In or for mechanism for making truncated conical tubes, conveying mechanism comprising a turntable having on its upper surface a pair of guides that converge towards the centre of the table, means for rotating the turntable intermittently to pause with the guides located at a receiving station, a locating station and an applying station successively and means at the locating station operable automatically to move a blank supported on the table between the guides inwardly of the table.

2. In or for mechanism for making truncated conical tubes, conveying mechanism comprising a turntable having a plurality of pairs of guides of which the guides forming a pair converge towards the centre of the table, means for rotating the turntable intermittently through an angle equal to the angular spacing of the guides and to pause with a pair of guides located at a receiving station, a pair located at a locating station and a pair located at an applying station and means at the locating station operable automatically to move a blank supported on the table between the guides inwardly of the table.

3. In or for mechanism for making truncated conical tubes, conveying mechanism comprising a turntable having a plurality of equally spaced shallow trays formed in its upper surface, each of which trays has a pair of sides converging towards the center of the turntable, means for rotating the turntable through an angle equal to the angular spacing of the trays to bring each tray in turn to a receiving station, a locating station, and an applying station successively, and means at the locating station operable automatically, while the table is at rest, to move a blank supported in the tray at that station towards the centre of the table.

4. In or for mechanism for making truncated conical tubes, conveying mechanism comprising a turntable having a pair of guides that converge towards the centre of the table on its upper surface, means for rotating the turntable intermittently to pause with the guides located at a receiving station, a locating station and an applying station successively and a locating member mounted at the locating station to move in a plane that is more or less radial to the turntable to engage a blank supported on the turntable between the guides and move it towards the centre of the turntable, and means for automatically moving the locating member towards the turntable and away from the turntable while the latter is pausing with the guides at the locating station.

5. In or for mechanism for making truncated conical tubes, conveying mechanism comprising a horizontal turntable having a plurality of equally spaced shallow recesses on its upper surface each of which recesses has two sides that converge toward the centre of the turntable, means for rotating the turntable intermittently through an angle equal to the angular spacing of the recesses so that each recess is moved successively to a receiving station, a locating station and an applying station a locating member mounted at the locating station to rock in a plane that is substantially vertical and radial to the turntable from a position in which it is clear of a blank supported in the recess at the locating station to a position in which it engages this blank and presses it against the converging sides of the recess, means biasing the member to its second position and means for positively moving the member to its first position while the turntable is moving which means is operable while the turntable is stationary to permit the member to move to its second position.

6. Conveying mechanism according to claim 5, comprising a gum-applying member movable vertically from a position clear of the table to a position in which it rests upon a blank supported in a recess at the locating station, means biasing the gum-applying member to its second position and means operable automatically to raise the gum-applying member while the turntable is moving but to permit the gum-applying member to descend on to a blank after the locating member has moved towards the turntable to locate the blank.

7. In or for mechanism for making truncated conical tubes, conveying mechanism comprising a turntable, a pair of guides carried on the upper surface of the turntable and converging towards the centre of the table, means for rotating the turntable intermittently so that it pauses with the guides located successively at a receiving station, a locating station and an applying station, locating means at the locating station operable automatically, when the guides are at the locating station, to move a blank supported on the table between the guides inwardly of the table, a gum-applying member mounted at the locating station above the table for vertical movement, means for reciprocating said member towards and away from the table which means is operable automatically after the locating means have operated to permit the gum-applying means to descend into engagement with a blank supported on the table at the locating station and then to raise the said means clear of the table before the latter again moves, and a common driving member for the locating means and the means for reciprocating the gum-applying member.

8. Conveying means according to claim 7, comprising a foot, a lost motion connection by which the foot is mounted to move with the gum-applying member with provision for limited vertical movement relative thereto and a spring biasing the said foot relatively to the gum-applying means into a position in which it is located below said means.

DENNIS WOOD.
ALFRED GERMAN ROSE.